W. G. HOLLINGSWORTH.
LIQUID DISPENSING MACHINE.
APPLICATION FILED MAR. 30, 1909.
1,015,680.
Patented Jan. 23, 1912.
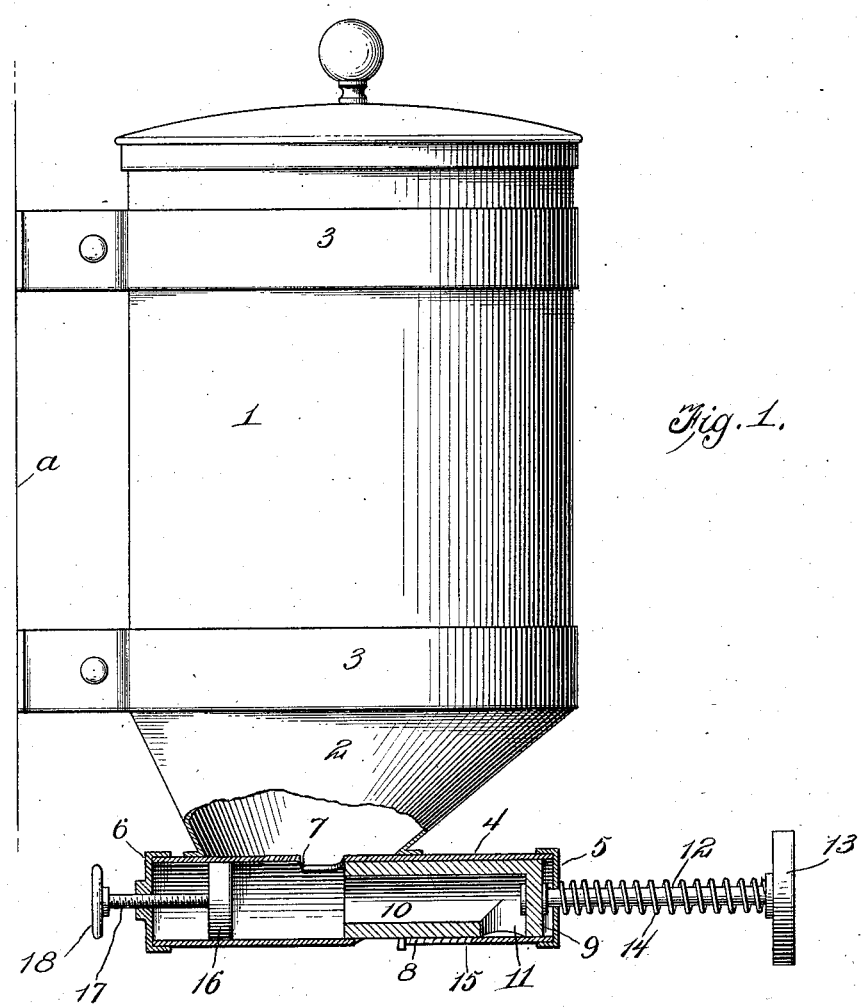
Witnesses
F. C. Gibson.
J. W. Garner
Inventor
William G. Hollingsworth
By Victor J. Evans
Attorney

UNITED STATES PATENT OFFICE.

WILLIAM G. HOLLINGSWORTH, OF SHEBOYGAN, WISCONSIN.

LIQUID-DISPENSING MACHINE.

1,015,680.

Specification of Letters Patent. Patented Jan. 23, 1912.

Application filed March 30, 1909. Serial No. 486,786.

*To all whom it may concern:*

Be it known that I, WILLIAM G. HOLLINGSWORTH, a citizen of the United States, residing at Sheboygan, in the county of Sheboygan and State of Wisconsin, have invented new and useful Improvements in Liquid-Dispensing Machines, of which the following is a specification.

This invention is an improved machine for dispensing measured quantities of liquid, such as perfume or the like from vessels and consists in the construction, combination and arrangement of devices hereinafter described and claimed.

In the accompanying drawings:—Figure 1 is an elevation partly in section of a liquid dispensing machine constructed in accordance with this invention. Fig. 2 is partly an elevation and partly a sectional view showing the modification of the same.

In the embodiment of the invention here shown, the vessel 1 which contains the liquid is cylindrical in form with a substantially funnel shaped bottom 2. Brackets 3 are provided by means of which the vessel may be secured to a wall or other support indicated at *a*. At the lower end of the funnel shaped bottom of the vessel is a horizontally disposed cylindrical valve and measuring casing 4, the ends of which are provided with closures 5, 6. The said valve casing is provided with an inlet opening 7 in its upper side which communicates with the interior of the vessel 1 and is provided in its under side at a suitable distance from its outer end with a discharge opening 8 which is out of line with the opening 7 and at a suitable distance therefrom.

A longitudinally movable valve and measuring plunger 9 is fitted in the valve and measuring casing 4 for operation therein and is provided with an L-shaped bore, the longitudinal arm 10 of which is open at the inner end of said plunger and the vertically downwardly extending arm 11 of which is open at the lower side of said plunger near the outer end of the latter. A stem or rod 12 is attached to the outer end of the said plunger and operates in an opening in the outer head or closure 5 of the casing and is provided at its outer end with a button 13 by means of which the said plunger may be operated. A coil spring 14 is placed on the stem or rod of the plunger and bears between the head or closure 5 of the valve casing and the button 13 and serves to normally keep the valve and measuring plunger in the position shown in Fig. 1 in the outer end of the valve and measuring casing with its discharge opening 11 out of line and non-communicating with the discharge opening 8 of the valve and measuring casing and between said opening 8 and the outer end of the valve and measuring casing. A stop stud 15 is here shown attached to the plunger 9 and operating in the opening 8 to limit the extent of movement of the plunger.

In the inner end portion of the valve and measuring casing is a gage element 16, shown as a piston or plunger in Fig. 1 which fits tightly in the bore of the valve and measuring casing and yet is movable therein. The said gage element, plunger or piston is provided with a screw threaded stem 17 which operates in a threaded opening in the head or closure 6 at the inner end of the valve and measuring casing and the said threaded stem is provided with a button 18 whereby it may be readily turned to adjust the gage element as may be required to vary the capacity of the valve and measuring casing to any desired extent.

In the modification of the invention shown in Fig. 2, the adjustable gage element 19 is a screw which engages a screw thread 20 in the bore of the valve and measuring casing 21. The said gage screw is provided with a stem 22 having a head 23 at its outer end whereby the said gage screw may be readily turned to adjust said gage screw in the valve and measuring casing as may be desired.

The operation of the invention is as follows: The valve or measuring plunger being normally, by the spring 14 kept in the outer end of the valve and measuring casing with the inner end of the bore of the plunger communicating with the inlet opening 7 of the casing and the outer or discharge opening 11 of the bore of the plunger to one side of and out of communication with the opening 8, the bore of the plunger and the effective portion of the valve and measuring casing become filled with liquid from the vessel *a*. By pressing in on the button 13 against the action of the spring 14, the plunger moves across and past the opening 7 to cut off communication between the bore of the plunger and the interior of the vessel and immediately thereafter the opening 11 of the plunger coincides with the opening 8 of the valve and measuring casing and hence all of the confined liquid in the bore of the plunger and valve and measuring casing is discharged through said openings 11 and 8. This quantity discharged at each operation of the valve and measuring plunger may be regulated or varied as may be required by means of the gage 16 as will be understood.

What is claimed is:—

1. A liquid measuring device, comprising a vessel having an outlet at the bottom thereof, a horizontally disposed measuring casing having non-registering inlet and outlet openings, the former communicating with the outlet of the vessel, a valve and measuring plunger normally disposed at one end of the casing at one side of said inlet and above and closing the outlet of the casing, said valve being provided with a longitudinal bore opening at its inlet end through the inner end of the valve and having its discharge end opening through the base of the valve adjacent the outer end of the latter, spring retracted means for sliding said plunger valve inwardly to bring said discharge end of the bore into register with the outlet of the casing, a follower arranged in the casing on the opposite side of said inlet and having an effective range of travel between the contiguous end of the casing and adjacent wall of the inlet, and means for adjusting said follower to vary the effective measuring capacity of the casing.

2. A liquid measuring device comprising a vessel having an outlet at the bottom thereof, a horizontally disposed measuring casing having non-registering inlet and outlet openings, the former communicating with the outlet of the vessel, a valve and measuring plunger normally disposed at one end of the casing at one side of said inlet and above and closing the outlet of the casing, said valve being provided with a longitudinal bore opening at its inlet end through the inner end of the valve and having its discharge end opening through the base of the valve adjacent the outer end of the latter, spring retracted means for sliding said plunger valve inwardly to bring said discharge end of the bore into register with the outlet of the casing, a stud carried by the plunger valve and movable in the outlet opening of the casing, said stud being adapted to engage the inner end wall of said opening to limit the opening movement of the plunger valve, a follower arranged in the casing on the opposite side of said inlet and having an effective range of travel between the contiguous end of the casing and adjacent wall of the inlet, and means for adjusting said follower to vary the effective measuring capacity of the casing.

3. A liquid measuring device comprising a vessel having an outlet at the bottom thereof, a measuring casing extending across said outlet and provided in its top with an inlet communicating with said outlet of the vessel and in its bottom with an outlet, the latter being arranged at a point between the inlet and one end of the casing, a plunger valve movable in the said end of the casing, said valve having a longitudinal bore opening at its inlet end through the inner end of the plunger valve and having an outlet at its opposite end opening through the bottom of said plunger valve, spring retracted means for operating the plunger valve, a device arranged within the end of the casing on the opposite side of the casing inlet from the plunger valve and normally spaced from the latter and adjustable between said casing inlet and adjacent end of the casing to vary the effective capacity of the latter, and means for adjusting said device.

4. A liquid measuring device comprising a vessel having an outlet at the bottom thereof, of a horizontally disposed measuring casing having non-registering inlet and outlet openings, the former communicating with the outlet of the vessel, a valve and measuring plunger normally disposed at one end of the casing and wholly at one side of said inlet and above and closing the outlet of the casing, said valve being provided with a longitudinal bore opening at its inlet end through the inner end of the valve and having its discharge end opening through the base of the valve adjacent the outer end of the latter, the opposite end of the casing being screw-threaded to a point adjacent to the inlet thereof, a follower arranged within the threaded portion of the casing and threaded to engage therewith so as to have an effective range of travel between the contiguous end of the casing and adjacent wall of the inlet, and an elongated stem connected with the follower whereby the latter may be adjusted to vary the effective measuring capacity of the casing.

In testimony whereof I affix my signature in presence of two witnesses.

WILLIAM G. HOLLINGSWORTH.

Witnesses:
J. W. HANSEN,
D. W. HUENINK.

Copies of this patent may be obtained for five cents each, by addressing the "Commissioner of Patents, Washington, D. C."